Dec. 4, 1928.
G. P. PETERSON
AUTOMATIC MACHINE WORK TRANSFERRER
1,693,959
Filed Aug. 7, 1922   2 Sheets-Sheet 1
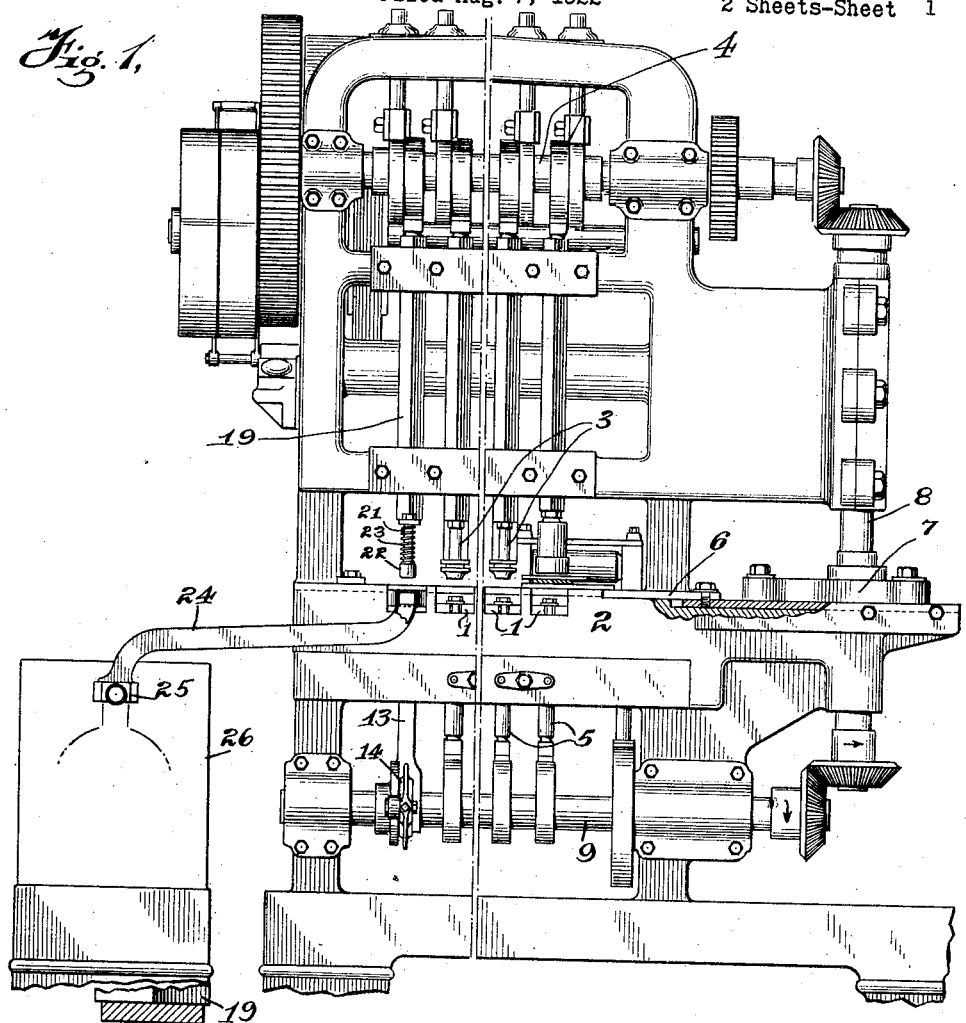
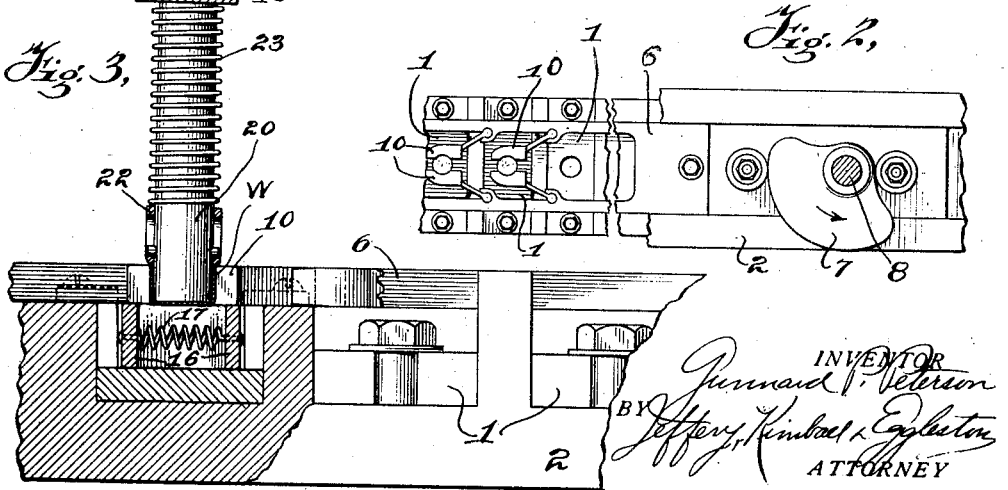
INVENTOR
Gunnard P. Peterson
BY Jeffery, Kimball & Eggleston
ATTORNEY Dec. 4, 1928.　　　　　　　　　　　　　　　　　　1,693,959
G. P. PETERSON
AUTOMATIC MACHINE WORK TRANSFERRER
Filed Aug. 7, 1922　　　　2 Sheets-Sheet 2
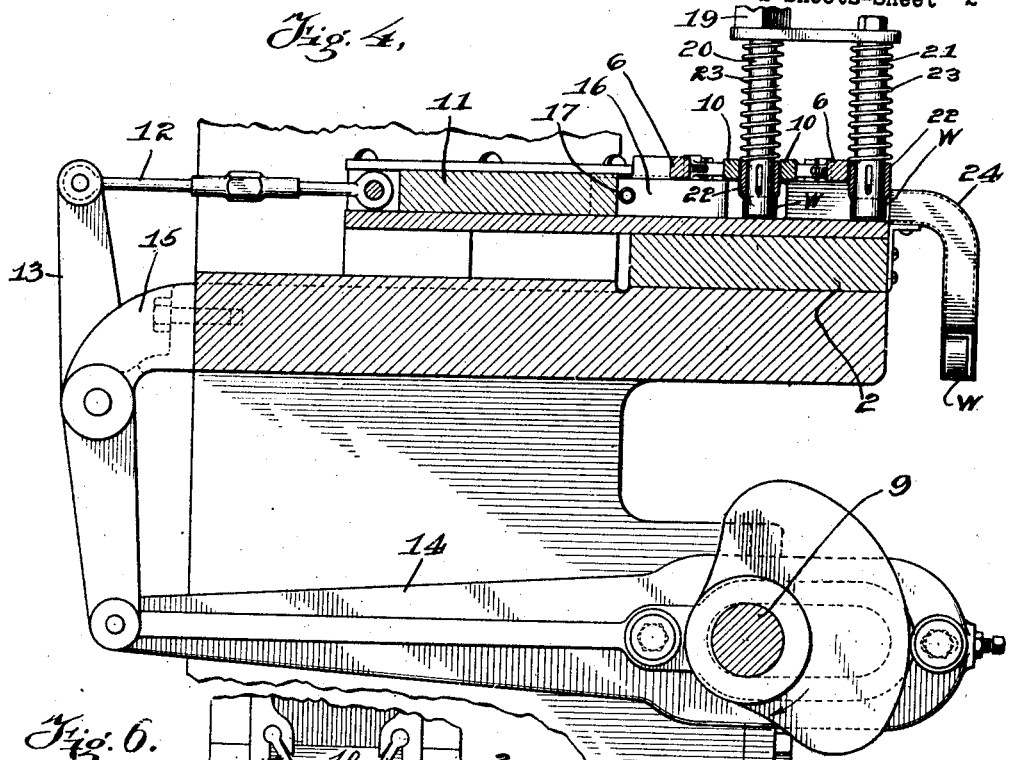
Fig. 4.
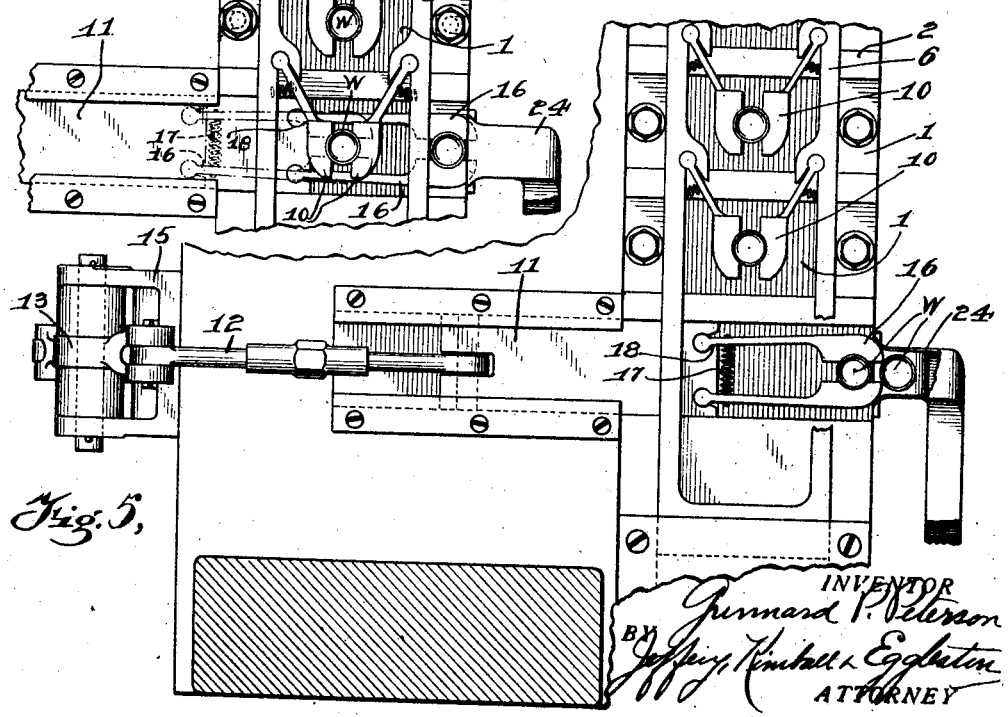
Fig. 6.
Fig. 5.
INVENTOR
Gunnard P. Peterson
BY
Jeffery, Kimball & Eggleston
ATTORNEY Patented Dec. 4, 1928.

1,693,959

UNITED STATES PATENT OFFICE.

GUNNARD P. PETERSON, OF NAUGATUCK, CONNECTICUT, ASSIGNOR TO THE RISDON MANUFACTURING COMPANY, OF NAUGATUCK, CONNECTICUT, A CORPORATION OF CONNECTICUT.

AUTOMATIC-MACHINE WORK TRANSFERRER.

Application filed August 7, 1922. Serial No. 580,085.

The object of this invention is the provision of simple and practical means for discharging the work of automatic punch presses or like machines so as to cause the delivery of articles in uniform and orderly manner, and more especially for maintaining control of the position of the work during its discharge and transfer from a first machine to a second machine wherein it is to be further operated upon. The principles of organization and construction of the invention are herein illustrated in a particular embodiment adapted for effecting the transfer of a drawn tubular shell or ferrule from the multi-plunger punch press in which it is shaped or made, to a second machine in which it is threaded or knurled or further worked as in the manufacture of the threaded contact shells for electric lamp bases or lamp sockets, but it will be apparent that the same principles may be applied in variant forms to other and various kinds of automatic machinery where it is desired that a piece of work fabricated in a first machine shall be transferred in definite relative position into the chuck or work-holding means of some other adjacent machine.

In the accompanying drawings Figure 1 represents a front elevation of a multi-plunger punch press, with its central portion broken away or removed, and diagrammatically shows a portion of the second machine in an adjacent position.

Figure 2 is a detail plan of part of the work carrier of the press. Figure 3 is a larger scale of detail of the plunger by which the work is exchanged from one carrier to the other carrier. Figure 4 is a cross-section through the transfer work carrier, Figure 5 a detailed plan of both carriers, and Figure 6 a similar plan of the same parts in other positions.

The press shown is well known in the art and comprises a series of die blocks 1 mounted on the bed 2 of the press and a corresponding series of die plungers 3 mounted to reciprocate in the superstructure of the machine and actuated by a plunger cam shaft 4. The blank or stock is fed to the machine at the righthand end in Fig. 1, and after being operated on by the first die plunger of the series is ejected from the die cavity at that station by the corresponding ejector 5 into the control of a reciprocating work carrier 6. By means of this carrier the piece of work resulting from the first drawing or punching operation is advanced along the bed, to the left, into position to be operated on by the next die and die plunger, and so on, step by step from each die station to the next, until it reaches the transfer mechanism which is placed at the opposite or lefthand end of the machine. The work carrier 6 is mounted in a slideway extending the length of the bed and is reciprocated by a cam 7 on the upright lay shaft 8 through which the ejector cam shaft 9 is driven, as indicated in the figure. Various other parts of this familiar machine will be recognized from the drawing without description, and it will be apparent that certain parts have been omitted because not necessary to an understanding of the present invention.

The work carrier 6 is equipped with pairs of spring-pressed work-holding fingers 10 appropriately shaped to grasp and hold the particular kind of work, and these pairs of fingers correspond to the series of die stations so that in one position of the carrier, the righthand position in Fig. 1, each pair registers with a die station and receives the work from the ejector of that station. On the operation of the ejectors the work carrier is moved to the left and each pair of fingers then registers with the next adjacent die station, where the descending die plungers 3 carry the pieces of work into the die cavities at those stations for the next operation, as will be understood. In this manner the work is caused to advance through the series of die stations and the last acting pair of fingers 10 carries the product work beyond the last die station to a point herein termed the exchange station, where the work is transferred to a second work carrier herein termed the transfer carrier. This is the position of the work carrier 6 indicated in Fig. 6. The detail construction of the work carrier 6 will be clear enough from the drawing and is of no particular consequence to the present invention so long as it is adapted to perform the functions above described and well understood in the art.

The transfer carrier in the present case is formed as a cross-slide 11 and mounted to reciprocate in a slideway cut or built into the bed 2 of the first machine so as to move back and forth in a path immediately adjacent to the path of the work carrier 6 and preferably in a parallel plane just below it. This carrier is reciprocated in its slideway by a connecting rod 12, lever 13 and cam rod 14 from a suitable cam on the ejector cam shaft 9 above referred to, the fulcrum bracket 15 for the lever 13 being bolted to the back side of the press frame. The transfer carrier has a pair of work-holding fingers 16 drawn toward each other by the tension spring 17 connected between them and held at a predetermined distance apart by the shoulders 18 on the carrier body. The forward ends of the fingers 16 are shaped to receive or grasp the work and by the reciprocation of the carrier are moved from a position in registry with the point of exchange from carrier to carrier, indicated by the superposition of fingers 10 and 16 in Fig. 6 to the position indicated in Fig. 5, which latter position is herein termed the delivery station.

The exchange of the work from carrier to carrier is effected by means of double plunger mechanism mounted above the path of the transfer carrier and preferably operated by the plunger cam shaft 4. Thus, in the case illustrated, the plunger mechanism is mounted on the lower end of one of the slide rods 19 of the punch press, of the same general design and mounting as the other slide rods thereof, and it comprises an exchange plunger 20 and a release plunger 21 spaced apart a fixed distance corresponding to the distance between the exchange station and the delivery station. The lower end of each plunger is adapted to enter the interior of the shell $w$, which represents the work in the present case, and each is provided with a clearer collar 22 guided by an oblong slot and pin and downwardly pressed thereon by a spring 23.

In the preferred operation the several cams are so timed that when the last pair of work-holding fingers 10 of the carrier slide 6 has reached the exchange station as indicated in Fig. 6 the exchange plunger 20 descends, engages the shell $w$ held in said fingers as indicated by Fig. 3 and carries it thence downwardly into the wide space between the shanks of the transfer fingers 16 which are then in a forward position. At this moment two carriers may be in the relative positions indicated by the full lines in Fig. 6 and the shell $w$ is pressed onto the floor of the transfer slideway and held firmly pressed against it by the clearer spring 23. As the work carrier 6 recedes its fingers 10 draw off of the exchange plunger 20, or its collar 22, leaving the shell $w$ held by the end of the plunger 20 in the position stated. While thus held, the transfer fingers 16 draw over and snap around the clearer collar 22 and therefore around the shell $w$, as indicated in Fig. 4, so that when the plunger 20 ascends it withdraws from the shell or the latter is pushed off of it by the clearer collar, leaving it grasped resiliently by the transfer fingers. According to the cam timing this exchange of the shell from one carrier to the other may take place either before or after the fingers 10 have receded from the exchange plunger. As shown in Fig. 4, the transfer fingers have clasped the work while the carrier fingers 10 are still located at the exchange station. The next advance movement of the transfer fingers carries the shell $w$ to the delivery station at the opposite end of the path of the transfer carrier, which position is indicated in Fig. 5. On the next descent of the plunger mechanism the releasing plunger 21 enters and engages the shell in this position, holding it pressed against the slideway floor in the same manner as the exchange plunger 20, while the transfer fingers draw off of it so that when the releasing plunger again ascends it leaves it resting at the end of the slideway. During this operation by the releasing plunger it will be understood that the exchange plunger 20 has been repeating its former operation on the next succeeding shell. When the transfer fingers 16 bring said next shell to the delivery station they push the preceding shell into the flaring mouth of a conduit 24, through which it slides or rolls by gravity, or is otherwise taken to the chuck 25 of the second machine 26. This conduit or tube is formed with a cross-sectional contour similar to that of the shell and is thereby adapted to prevent the turning of the latter therein so that the shells are thus always presented to the chuck of the second machine in a predetermined position, but in this respect the said tube will be understood to represent any suitable form of work-conveying mechanism adapted to maintain control of position of the work from the delivery station to the place of deposit.

It is preferred that the two plungers operate in unison and that while the releasing plunger 21 enters the shell held at the delivery station of the transfer fingers the exchange plunger 20 is engaged in entering and discharging the next following shell from the fingers 10 into position to be engaged by the transfer fingers on their next recession, and so on. In this way the double plunger mechanism makes one reciprocation for each stroke of the other plungers of the press; but it will be apparent that if desired, and by suitable change in the timing, the exchange plunger 20 could discharge the shell directly from the fingers 10 into the fingers 16 without otherwise departing from the structure disclosed and the principle of operation thereof.

It will be apparent also that by mounting the transfer carrier on the bed of the first machine so as to move crosswise to the path of the work carrier of that machine, whether by oscillatory or straight reciprocatory movement, all the mechanism constituting the present invention may be conveniently and easily mounted on the framing of said machine with but slight alteration therein and can be directly operated by the existing mechanism, cam shafts, etc., as shown, without requiring the addition of extra or special gears or bearings, or at least with a minimum of new parts.

Claims:

1. The combination of a punch press having a main carrier organized for advancing the work from a die to an exchange station, a transfer work carrier mounted and operated to move back and forth from said exchange station to a delivery station and holding means comprising double plunger mechanism operative to hold the work during its exchange from carrier to carrier and during its release from the transfer carrier, said mechanism including plungers adapted to engage the work pieces.

2. The combination of a punch press having a main carrier organized for advancing the work from a die to an exchange station, a transfer work carrier mounted and operated to move back and forth from said station to a delivery station, a plunger to effect the exchange of the work to the transfer carrier, and a second plunger operative simultaneously to effect the release of the preceding work piece from the transfer carrier.

3. The combination of a punch press having a main reciprocating carrier for advancing the work, a transfer carrier, a plunger adapted to engage and hold the work during its exchange from carrier to carrier, means for releasing the work from the transfer carrier and a transfer conduit into which the released work is moved by the transfer carrier.

4. The combination of a first machine, a second machine adapted to operate on the product work thereof and means for conducting the work from the first to the second machine, comprising a carrier on the first machine, a transfer carrier mounted to move back and forth and having resilient work-holding fingers, means for exchanging the work from the first work carrier to said fingers, means for holding and so releasing the work while the fingers are moved away and means for conveying the released work to the second machine, said holding means including a plunger adapted to engage the work piece.

5. Means for transferring work from multi-plunger punch presses to other machines comprising the combination with a reciprocating work carrier mounted on the punch press, of a transfer carrier having spring-actuated work-holding fingers mounted to move back and forth from an exchange station adjacent said work carrier to a delivery station, plunger means for effecting the exchange of the work from said work carrier to the transfer carrier and a second plunger means for retaining the work against movement when said fingers are moved back to effect the release of the work therefrom, each of said plunger means including a plunger adapted to engage and hold the work.

6. The combination in a multi-plunger punch press, of a die-bed, a work carrier slide adapted to advance the work along the same, a die plunger operating shaft, a cross slideway on the bed beneath said carrier slide, a reciprocating transfer slide in said slideway and exchange mechanism comprising a pair of plungers operated by said shaft for effecting the exchange of the work from the first mentioned slide to said transfer slide.

7. The combination of two reciprocating work-holding carriers and mechanism for effective exchange of the work from carrier to carrier comprising a plunger adapted to enter the work and a work-engaging clearer member mounted on the plunger.

8. The combination of a punch press having a main carrier organized for advancing the work from a die to an exchange station, a transfer work carrier mounted and operated to move back and forth from said station to a delivery station, a plunger at the exchange station for effecting the exchange of the work to the transfer carrier and a second plunger at the delivery station for effecting the release of the work from the transfer carrier, said plungers being adapted to engage and hold the work at said stations.

9. Transfer mechanism of the kind described, comprising a reciprocating work-carrier slide, a transfer carrier mounted to reciprocate transversely thereof, means for holding the work stationary while the work-carrier is withdrawn and the work is engaged by the transfer carrier, and means adjacent the limit of the path of movement of the transfer carrier to hold the work stationary while the transfer carrier is withdrawn.

In testimony whereof, I have signed this specification.

GUNNARD P. PETERSON.